(12) United States Patent
Shimuta

(10) Patent No.: US 11,486,768 B2
(45) Date of Patent: Nov. 1, 2022

(54) THERMOMETER

(71) Applicant: Murata Manufacturing Co., Ltd., Nagaokakyo (JP)

(72) Inventor: Toru Shimuta, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 254 days.

(21) Appl. No.: 16/879,006

(22) Filed: May 20, 2020

(65) Prior Publication Data

US 2020/0278260 A1 Sep. 3, 2020

Related U.S. Application Data

(63) Continuation of application No. PCT/JP2018/043606, filed on Nov. 27, 2018.

(30) Foreign Application Priority Data

Dec. 8, 2017 (JP) .............................. JP2017-236247

(51) Int. Cl.
  *G01K 1/14* (2021.01)
  *G01K 1/08* (2021.01)
  *G01K 13/20* (2021.01)
(52) U.S. Cl.
  CPC ................. *G01K 1/14* (2013.01); *G01K 1/08* (2013.01); *G01K 13/20* (2021.01)
(58) Field of Classification Search
  USPC .................................. 374/208, 166, 112, 183
  See application file for complete search history.

(56) References Cited

U.S. PATENT DOCUMENTS 7,354,195 B2    4/2008   Sakano
8,573,843 B2   11/2013   Tsuchida
(Continued)

FOREIGN PATENT DOCUMENTS

CN      102378905 A  *  3/2012  .......... A61B 5/0008
JP      S63133030 A     6/1988
(Continued)

OTHER PUBLICATIONS

International Search Report issued for PCT/JP2018/043606, dated Feb. 19, 2019.

(Continued)

*Primary Examiner* — Mirellys Jagan
(74) *Attorney, Agent, or Firm* — ArentFox Schiff LLP

(57) ABSTRACT

A deep body thermometer that includes a body temperature measurement unit having a thermal resistor layer formed of a thermal resistor having a predetermined thermal resistance value, four temperature sensors arranged in a thickness direction of the thermal resistor layer, and a wiring substrate on which a processing circuit for processing an output signal of each of the four temperature sensors is mounted. Moreover, the thermometer includes an upper exterior body made of a foamed material of a closed cell or a semi-closed cell having a waterproof property to accommodate the body temperature measurement unit, and a lower exterior body formed of a non-foamed resin film having a waterproof property, in which peripheral edge portions of the upper exterior body and the lower exterior body are fixed in a close contact manner.

20 Claims, 9 Drawing Sheets

(56) References Cited

U.S. PATENT DOCUMENTS

| | | | |
|---|---|---|---|
| 2005/0141591 A1 | 6/2005 | Sakano | |
| 2006/0056487 A1* | 3/2006 | Kuroda | G01K 1/165 |
| | | | 374/E7.042 |
| 2011/0243183 A1* | 10/2011 | Goto | G01K 7/427 |
| | | | 374/E3.001 |
| 2014/0275932 A1 | 9/2014 | Zadig | |
| 2015/0313474 A1* | 11/2015 | Goto | A61B 5/6833 |
| | | | 600/549 |
| 2016/0069752 A1* | 3/2016 | Shimizu | G01K 13/20 |
| | | | 600/549 |
| 2018/0028072 A1* | 2/2018 | Shi | A61B 5/6815 |

FOREIGN PATENT DOCUMENTS

| | | |
|---|---|---|
| JP | 2003270051 A | 9/2003 |
| JP | 2007212407 A | 8/2007 |
| JP | 2008128781 A | 6/2008 |
| JP | 2016515022 A | 5/2016 |
| WO | 2012042759 A1 | 4/2012 |

OTHER PUBLICATIONS

Written Opinion of the International Searching Authority issued for PCT/JP2018/043606, dated Feb. 19, 2019.
Examination report issued for India application No. 202037028453, dated Jul. 29, 2021.

* cited by examiner

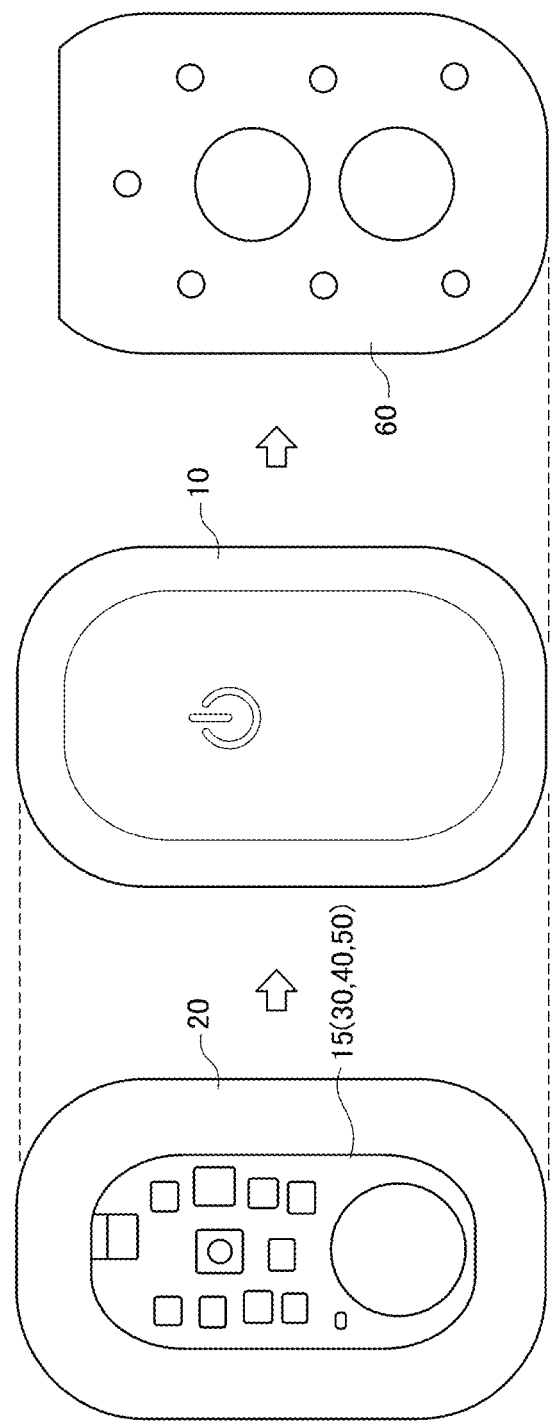

THERMOMETER

CROSS REFERENCE TO RELATED APPLICATIONS

The present application is a continuation of PCT/JP2018/043606 filed Nov. 27, 2018, which claims priority to Japanese Patent Application No. 2017-236247, filed Dec. 8, 2017, the entire contents of each of which are incorporated herein by reference.

TECHNICAL FIELD

The present invention relates to a thermometer for measuring a body temperature, and more particularly, to a sticking-type thermometer for continuously measuring a body temperature to acquire body temperature data.

BACKGROUND

Currently, there are proposed techniques of continuously detecting a body surface temperature and measuring a body temperature. For example, Patent Document 1 (identified below) discloses a wearable temperature measuring device that estimates a body temperature such as a temperature in the mouth based on time-series body temperature data (for example, body surface temperature data of a measurement subject measured during sleep).

A casing forming a main body of the wearable temperature measuring device is formed in an oval or substantially oval box shape using, for example, a resin material, and a circuit board or the like on which a microcomputer and the like are mounted is housed inside the casing. On a front side of the casing (on the body surface side of the measurement subject), there are two openings penetrating in a substantially circular shape. Additionally, a body surface temperature detecting portion configured by a temperature measuring element formed of a thermistor and the like and a metal cover covering the temperature measuring element to detect the temperature of the body surface is attached to one opening. Further, an auxiliary body surface temperature detecting portion configured by the temperature measuring element and the cover to supplementarily detect the temperature of the body surface influenced by an outside air is attached to the other opening. Further, an outside air temperature detecting portion configured by the temperature measuring element and the cover to detect an outside air temperature is attached to a surface on a rear side of the casing.

In operation, the wearable temperature measuring device estimates, by using an inverse operation model constructed by a PLS regression analysis by using a body surface temperature data group and the body temperature measured in advance, the body temperature from a temperature data group in which the temperature detection data detected by each temperature detecting portion is arranged in time series.

Patent Document 1: Japanese Unexamined Patent Application Publication No. 2008-128781.

When continuously measuring the body surface temperature by wearing the device on the body surface of the measurement subject, when a circuit board or the like for processing detection signals of the temperature measuring elements is built in, there is also a possibility that the measurement accuracy may be lowered and the failure may be caused thereby when sweat or the like enters the inside of the device, for example. Further, when used in a hospital or the like, for example, when the device is disinfected, there is also a possibility that a disinfecting solution may enter the inside of the device.

However, the wearable temperature measuring device described in the above-described Patent Document 1 does not take into consideration waterproof properties of preventing sweat, disinfecting solution, and the like from entering the inside of the device. Therefore, there has been a demand for a technique for ensuring the waterproof properties with a relatively simple structure without lowering measurement sensitivity and measurement accuracy.

SUMMARY OF THE INVENTION

Accordingly, the present invention has been made in order to solve the above-described problems. It is thus an object of the present invention is to provide a stick-type thermometer that has a wiring substrate provided therein, is attached to a body surface, and continuously measures a body temperature to acquire body temperature data. Moreover, the thermometer is configured to ensuring waterproof properties with a relatively simple structure without lowering measurement sensitivity and the like.

In an exemplary aspect, to thermometer is provided that is attached to a body surface and continuously measures a body temperature to acquire body temperature data. The exemplary thermometer includes a body temperature measurement unit having a thermal resistor layer formed of a thermal resistor having a predetermined thermal resistance value, a plurality of temperature detection units arranged in a thickness direction of the thermal resistor layer, and a wiring substrate on which a processing circuit for processing an output signal of each of the plurality of temperature detection units is mounted. Moreover, the thermometer includes an upper exterior body that is made of a foamed material of a closed cell or a semi-closed cell having a waterproof property and accommodates the body temperature measurement unit; and a lower exterior body formed of a non-foamed resin film, in which peripheral edge portions of the upper exterior body and the lower exterior body are in close contact with each other.

According to the exemplary thermometer, the upper exterior body for accommodating the body temperature measurement unit is made of the foamed material of the closed cell or the semi-closed cell having a waterproof property, and the lower exterior body is formed of the non-foamed resin film. Additionally, the peripheral edge portions of the upper exterior body and the lower exterior body are in close contact with each other. That is, since the upper exterior body and the lower exterior body that are formed of a material having the excellent waterproof property (not having moisture permeability) are in close contact with each other, sweat, disinfecting solution, and the like can be prevented from entry into the inside of the device with a relatively simple structure. Further, since the lower exterior body (e.g., the side in contact with the body surface) is formed of the non-foamed resin film excellent in thermal conductivity, the measurement sensitivity of body temperature may be favorably maintained. Further, since the upper exterior body (e.g. the side in contact with the outside air) is made of the foamed material, which has low thermal conductivity (that is, excellent in heat insulating property), of a closed cell or a semi-closed cell, it is hardly affected by an outside air temperature change (disturbance), and a stable body temperature measurement may be performed. As a result, waterproof properties can be provided with a relatively simple structure without lowering the measurement sensitivity and the like.

Moreover, according to an exemplary aspect, a sticking-type thermometer is provided having a wiring substrate internally, and being attached to a body surface to continuously measure a body temperature and acquire body temperature data. Thus, a waterproof property can be ensured with a relatively simple structure without lowering the measurement sensitivity and the like.

BRIEF DESCRIPTION OF DRAWINGS

FIG. 9 is a view (part 2) for explaining a method of assembling the deep body thermometer according to the exemplary embodiment.

DETAILED DESCRIPTION OF EMBODIMENTS

Figure 1:
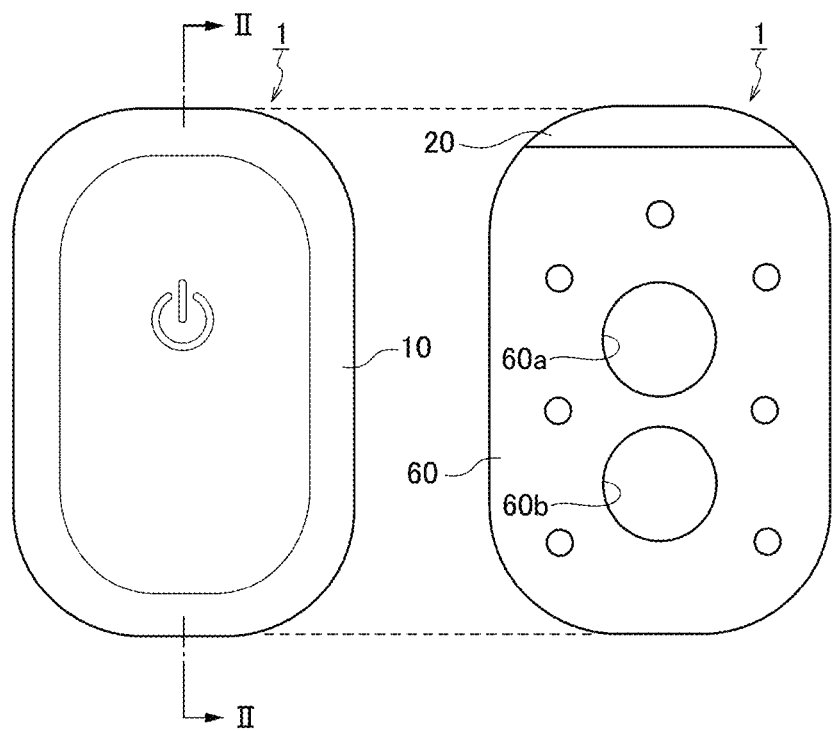
FIG. 1 includes a plan view and a bottom view illustrating an appearance of a deep body thermometer according to an exemplary embodiment.

Hereinafter, an exemplary embodiment of the present invention will be described in detail with reference to the accompanying drawings. It is noted that in the drawings, the same or corresponding parts will be denoted by the same reference numerals. Further, in the drawings, the same elements are denoted by the same reference numerals, and redundant description thereof will be omitted.

Figure 2:
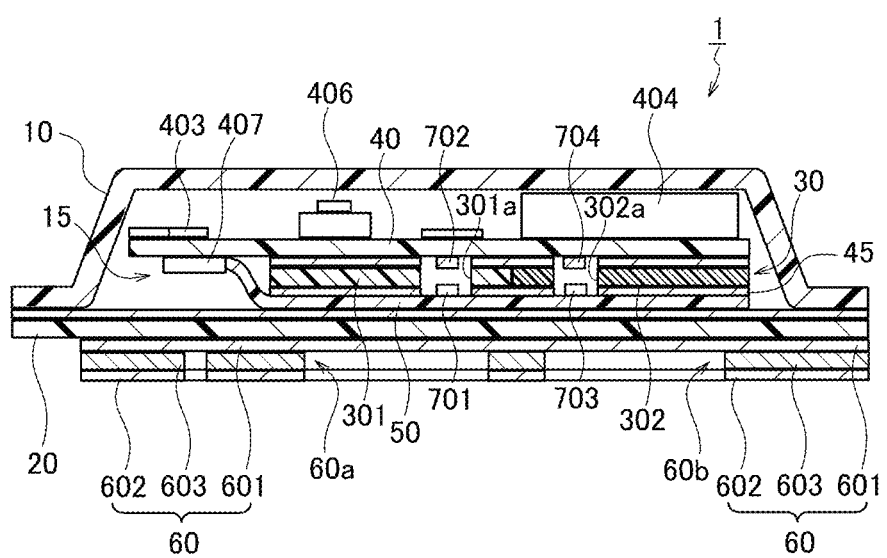
FIG. 2 is a cross-sectional view illustrating a configuration of the deep body thermometer according to the exemplary embodiment.
Figure 3:
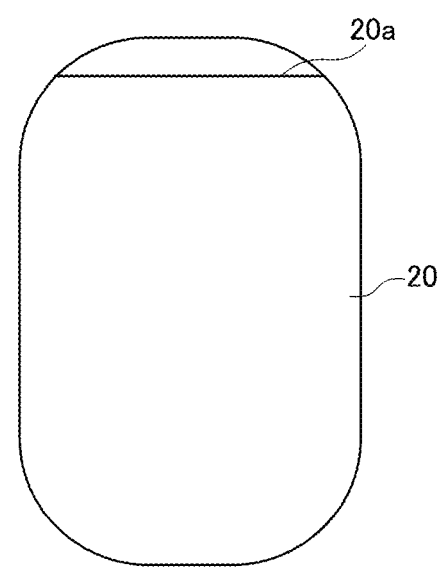
FIG. 3 is a plan view illustrating a lower exterior body configuring the deep body thermometer according to the exemplary embodiment.
Figure 4:
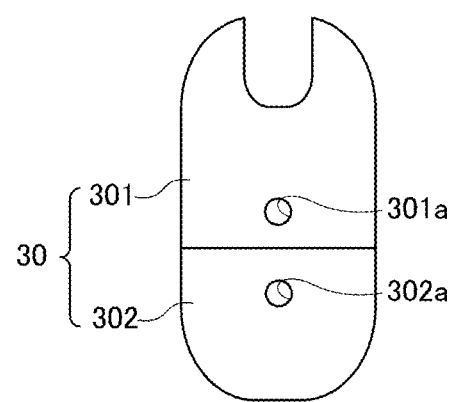
FIG. 4 is a plan view illustrating a thermal resistor layer configuring the deep body thermometer according to the exemplary embodiment.
Figure 5:
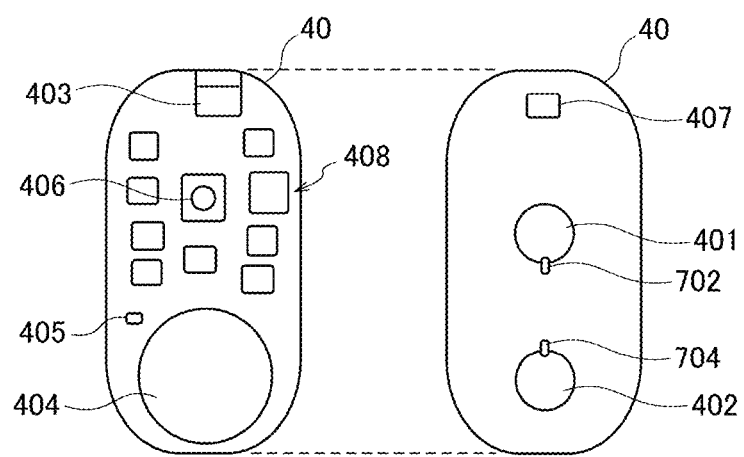
FIG. 5 includes a plan view and a bottom view illustrating a wiring substrate configuring the deep body thermometer according to the exemplary embodiment.
Figure 6:
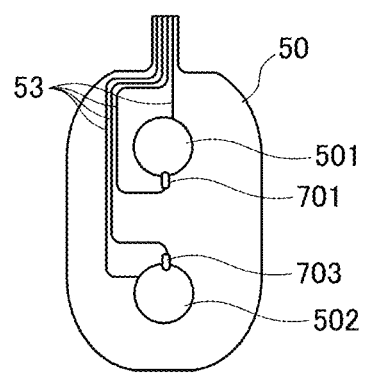
FIG. 6 is a plan view illustrating a flexible substrate configuring the deep body thermometer according to the exemplary embodiment.
Figure 7:
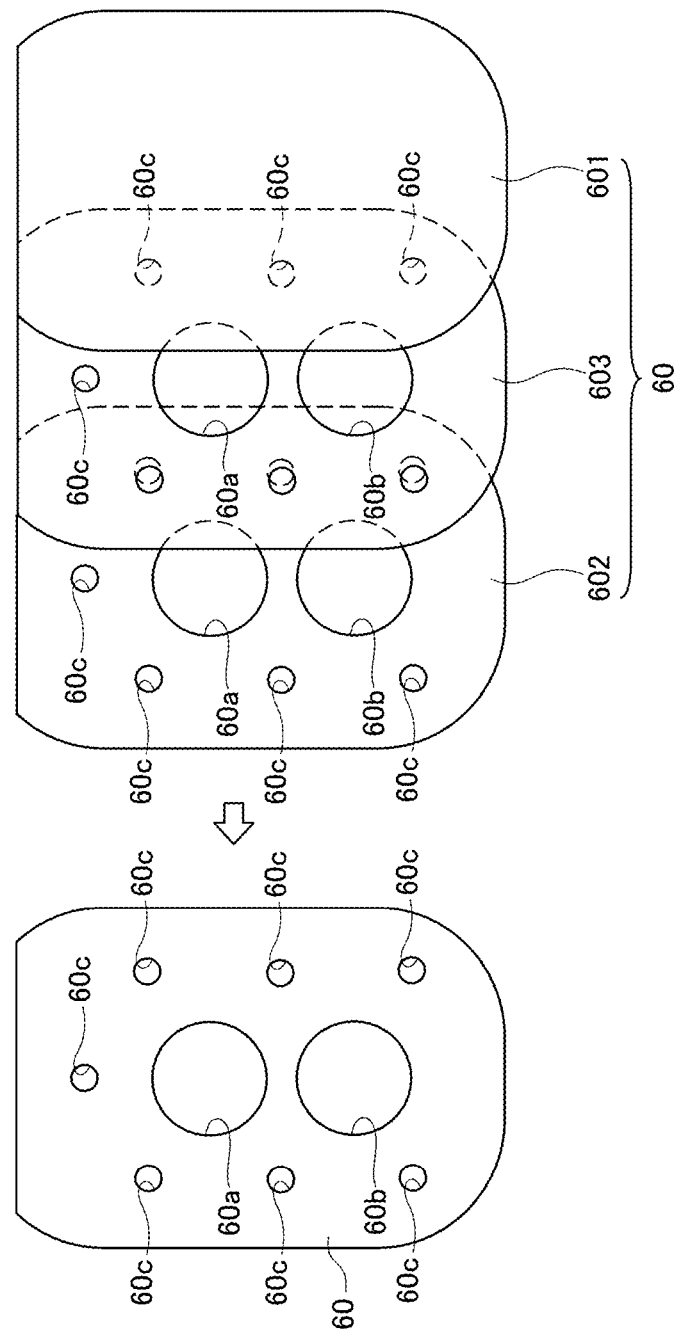
FIG. 7 includes a plan view and an exploded view illustrating a sticking member configuring the deep body thermometer according to the exemplary embodiment.

First, a configuration of a thermometer 1 according to the embodiment will be described with reference to FIG. 1 to FIG. 7 together. Here, a case where the present invention is applied to a non-heating-type deep body thermometer (hereinafter simply referred to as a "deep body thermometer") will be described as an example. FIG. 1 includes a plan view and a bottom view illustrating an appearance of the deep body thermometer 1. FIG. 2 is a cross-sectional view (cross-sectional view taken along a line II-II in FIG. 1) illustrating a configuration of the deep body thermometer 1. FIG. 3 is a plan view illustrating a lower exterior body 20 configuring the deep body thermometer 1. FIG. 4 is a plan view illustrating a thermal resistor layer 30 configuring the deep body thermometer 1. FIG. 5 includes a plan view and a bottom view illustrating a wiring substrate 40 configuring the deep body thermometer 1. FIG. 6 is a plan view illustrating a flexible substrate 50 configuring the deep body thermometer 1. FIG. 7 is a plan view and an exploded view illustrating a sticking member 60 configuring the deep body thermometer 1. It is generally noted that the scale of each drawing is changed in consideration of visibility.

In general, the deep body thermometer 1 is a non-heating-type deep body thermometer that is configured to obtain a heat flow rate from a deep portion of a measurement subject based on a difference between temperatures detected by a first temperature sensor 701 and a second temperature sensor 702 and a difference between temperatures detected by a third temperature sensor 703 and a fourth temperature sensor 704 to acquire a deep body temperature. Further, the deep body thermometer 1 is a sticking-type deep body thermometer that is configured to be stuck to a body surface of the measurement subject and to continuously measure the body temperature to acquire body temperature data. In particular, the deep body thermometer 1 is a deep body thermometer that ensures a waterproof property with a relatively simple structure without lowering measurement sensitivity and the like.

The deep body thermometer 1 is configured to mainly include an upper exterior body 10, the lower exterior body 20, a body temperature measurement unit 15, and the sticking member 60. Further, the body temperature measurement unit 15 is configured to mainly include the thermal resistor layer 30, the wiring substrate 40 on which the second temperature sensor 702 and the fourth temperature sensor 704 are mounted, and the flexible substrate 50 on which the first temperature sensor 701 and the third temperature sensor 703 are mounted. Hereinafter, each element of the deep body thermometer 1 will be described in detail.

The upper exterior body 10 is made of, for example, a foamed material of a closed cell or a semi-closed cell having a waterproof property. In order to prevent a temperature of the body temperature measurement unit 15 from locally changing due to rapid fluctuation (i.e., change) in the outside air temperature, the upper exterior body 10 preferably uses a foamed material having low thermal conductivity. It is noted that as the material, for example, polyurethane, polystyrene, polyolefin, or the like is preferably used. Further, as a processing method of the upper exterior body 10, for example, vacuum molding is preferably used. The upper exterior body 10 is formed in a concave shape in cross-section in a manner such that the body temperature measurement unit 15 (i.e., the thermal resistor layer 30, the wiring substrate 40, the flexible substrate 50, and the like) may be accommodated therein. Therefore, a side surface of the thermal resistor layer 30 are covered with the foamed material, and the side surface of the thermal resistor layer 30 are prevented from being exposed to the outside air.

The lower exterior body 20 is formed of, for example, a non-foamed resin film having a waterproof property (e.g., a low moisture permeability) and having higher thermal conductivity than that of the upper exterior body 10. Examples of the material include polypropylene, polyethylene, polyester, polyimide, and the like, and in particular, polyethylene terephthalate is preferably used. The lower exterior body 20 is formed in a planer (i.e., flat) shape in a manner such that the flexible substrate 50 (body temperature measurement unit 15) to which the first temperature sensor 701 and the third temperature sensor 703 are attached may be fixed in a close contact manner. It is noted that thermal resistance is varied when a gap is formed between the body temperature measurement unit 15 and the lower exterior body 20, which influences the heat flux, so that it is preferable that the body temperature measurement unit 15 and the lower exterior body 20 be fixed in a close contact manner by a method of bonding with a double-sided adhesive tape or a film having adhesiveness on both sides, or a method of fixing with an adhesive. The size (e.g., outer dimension) of the upper exterior body 10 and the lower exterior body 20 is formed to be the same (or substantially the same), and is formed to have sizes of, for example, about 40 to 100 mm in length and about 20 to 60 mm in width.

Then, a peripheral edge portion of the upper exterior body 10 formed with a concave (e.g., substantially hat-shaped) cross-section and a peripheral edge portion of the lower exterior body 20 formed in a planar shape are fixed in a close contact manner by, for example, bonding with a double-sided adhesive tape or a film having adhesiveness on both sides, fixing with an adhesive, heat sealing or the like. It is noted that in order to achieve waterproof performance, a portion where the upper exterior body 10 and the lower exterior body 20 are preferably fixed in a close contact manner be flat and have a structure in which wrinkles are less likely to be formed. That is, an outer edge portion of the lower exterior body 20 is preferably flat, an outer edge portion of the opposing upper exterior body 10 is also preferably flat, and the respective outer edge portions are stuck to each other and fixed in a close contact manner. In this case, force is uniformly applied to the fixed close-contact portion, and thus the problem of adversely affecting the waterproof performance, such as generation of wrinkles, is less likely to occur.

As illustrated in FIG. 2, the body temperature measurement unit 15 is configured by laminating the flexible substrate 50, the thermal resistor layer 30, and the wiring substrate 40 in this order from the lower exterior body 20 side.

The thermal resistor layer 30 includes two thermal resistors having different thermal resistance values, namely, a first thermal resistor 301 and a second thermal resistor 302, in order to form two heat fluxes (see FIG. 4). As the first thermal resistor 301, a material having higher thermal conductivity (e.g., a lower thermal resistance value) than that of the second thermal resistor 302, for example, plastic such as polypropylene, polyethylene, acrylic, polycarbonate, epoxy resin, or the like is preferably used. As the second thermal resistor 302, a material having lower thermal conductivity (e.g., a higher thermal resistance value) than that of the first thermal resistor 301, for example, foamed plastic (e.g., foam material) such as polyurethane, polystyrene, polyolefin, or the like is preferably used. However, it is also possible to use plastic, rubber, or the like which is not foamed. Here, the thermal conductivity of the metal such as copper or aluminum is equal to or higher than 100 [W/m/K], whereas the thermal conductivity of plastic such as polypropylene, polyethylene, acrylic, polycarbonate, epoxy resin, or the like is about 0.1 to 0.5 [W/m/K], and is lower by about three digits. The thermal conductivity of the foamed plastic is much lower than that by almost one digit. The thermal conductivity of the air is much lower and is 0.024 [W/m/K]. The first thermal resistor 301 and the second thermal resistor 302 are formed to have substantially the same thickness in order to achieve reduction in cost by allowing the wiring substrate 40 and the flexible substrate 50 to be laminated on each other.

A third through-hole 301a penetrating in the thickness direction is formed in the first thermal resistor 301 configuring the thermal resistor layer 30. Similarly, a third through-hole 302a penetrating in the thickness direction is formed in the second thermal resistor 302 configuring the thermal resistor layer 30. The third through-hole 301a is formed in a manner such that the first temperature sensor 701 and the second temperature sensor 702 are housed in an inner side portion thereof in a plan view. In other words, the first temperature sensor 701 and the second temperature sensor 702, which are paired with each other, are arranged inside (e.g., in the inner side portion of) the third through-hole 301a in the thickness direction of the first thermal resistor 301. Similarly, the third through-hole 302a is formed in a manner such that the third temperature sensor 703 and the fourth temperature sensor 704 are housed in an inner side portion thereof in a plan view. That is, the third temperature sensor 703 and the fourth temperature sensor 704, which are paired with each other, are arranged inside (e.g., in the inner side portion of) the third through-hole 302a in the thickness direction of the second thermal resistor 302.

Here, as the first temperature sensor 701 to the fourth temperature sensor 704 (hereinafter, also collectively referred to as "a temperature detection unit"), for example, a thermistor, a temperature resistance resistor, or the like whose resistance values vary depending on temperatures is preferably used. It is noted that each of the temperature sensors preferably has small heat capacitance as much as possible from the viewpoint of enhancing responsiveness. Therefore, a chip thermistor is preferably used for each temperature sensor, for example. Each of the first temperature sensor 701 to the fourth temperature sensor 704 is electrically connected to a processing circuit 408 (see, e.g., FIG. 5), which will be described later, with a printed wiring interposed therebetween, and an electric signal (e.g., voltage value) corresponding to the temperature is read by the processing circuit 408.

Incidentally, in order to reduce the size of the thermal flow-type deep body thermometer 1, it is important to make the thermal resistor layer 30 (i.e., the first thermal resistor 301 and the second thermal resistor 302) small, however, when the thermal resistor layer 30 (the first thermal resistor 301 and the second thermal resistor 302) is made small, a difference in an output value between the paired temperature sensors becomes small, and thus measurement errors may be increased. Here, since each of the temperature sensors 701-704 (e.g., chip thermistor) has a substantially rectangular parallelepiped shape and is thick, the thickness of the temperature sensors may not be ignored when the thickness of the thermal resistor layer 30 (i.e., the first thermal resistor 301 and the second thermal resistor 302) made thinner. When each temperature sensor (e.g., chip thermistor) is in contact with the side surfaces of the thermal resistor layer 30, since heat is transferred from a contact point, the temperature (e.g., detection value) of the temperature sensor may become a temperature (e.g., value) deviating from the surface temperature of the thermal resistor layer 30. Therefore, in order to reduce the influence thereby, a structure is provided in which the third through-holes 301a and 302a are formed in the thermal resistor layer 30 around the temperature sensors, and the temperature sensors do not make contact with the side surfaces of the thermal resistor layer 30.

The wiring substrate 40 is, for example, a rigid substrate such as a glass epoxy substrate. The processing circuit 408 is configured for processing an output signal from each of the first temperature sensor 701 to the fourth temperature sensor 704 to acquire deep body temperature data and is mounted on the wiring substrate 40. In addition, a wireless communication unit 403 that transmits (e.g., outputs) the acquired deep body temperature data, and a coin battery 404 that supplies power to the processing circuit 408 and the wireless communication unit 403 are mounted on the wiring substrate 40. The processing circuit 408 mainly includes a temperature input circuit and an arithmetic processing circuit. The temperature input circuit is configured to include, for example, an amplifier (for example, an operational amplifier), an analog/digital converter (A/D converter), and the like for reading detection signals (e.g., output voltages) of the temperature sensors 701 to 704. The temperature input circuit amplifies the analog signal output from each of the temperature sensor 701 to 704, converts the amplified analog signal into a digital signal, and outputs the digital signal to the arithmetic processing circuit.

The arithmetic processing circuit is configured to calculate the deep body temperature from the read measurement (e.g., temperature) data. The arithmetic processing circuit is configured by, for example, an MCU (Micro Control Unit), an EEPROM, a RAM, and the like, and calculates the deep body temperature based on the detection values of the temperature sensors 701 to 704, which have been read by the temperature input circuit. In addition, the arithmetic processing circuit stores the calculated deep body temperature data in a memory such as the RAM or the like. Further, the arithmetic processing circuit is configured to output (e.g., transmits) the calculated deep body temperature data to an external apparatus wirelessly by outputting the calculated deep body temperature data to the wireless communication unit 403.

It is noted that, here, the arithmetic processing circuit is configured to calculate (e.g., estimates) the deep body temperature based on the temperature difference between the front and back surfaces of the thermal resistors 301 and 302, which is caused by the difference between the two heat fluxes formed by using the two thermal resistors 301 and 302 having different thermal resistances. More specifically, the arithmetic processing circuit calculates a deep body temperature Tb based on, for example, the following expression (1):

$$Tb=\{T1(T3-T4)*Ra1-T3(T1-T2)*Ra2\}/\{(T3-T4)*Ra1-(T1-T2)*Ra2\} \quad (1)$$

It is also noted that Tb represents a deep body temperature, T1 represents a temperature detected by the first temperature sensor 701, T2 represents a temperature detected by the second temperature sensor 702, and Ra1 represents a thermal resistance value of the first thermal resistor 301, respectively. Further, T3 represents a temperature detected by the third temperature sensor 703, T4 represents a temperature detected by the fourth temperature sensor 704, and Ra2 represents a thermal resistance value of the second thermal resistor 302, respectively.

Here, since Ra1 and Ra2 are known, the deep body temperature Tb may be uniquely determined by detecting four temperatures (i.e., T1, T2, T3, T4).

On a lower surface of the wiring substrate 40, the second temperature sensor 702 for acquiring a temperature of an upper surface (e.g., outside air side) of the first thermal resistor 301, and the fourth temperature sensor 704 for detecting a temperature of an upper surface (e.g., outside air side) of the second thermal resistor 302 are mounted. More specifically, thermal equalization patterns 401 and 402 for equalizing a peripheral temperature distribution are formed on the lower surface of the wiring substrate 40, one electrode of the second temperature sensor 702 is connected to the thermal equalization pattern 401, and one electrode of the fourth temperature sensor 704 is connected to the thermal equalization pattern 402. The thermal equalization patterns 401 and 402 are formed of, for example, a material having high thermal conductivity such as a metal film.

In order to prevent the temperature of only a part of the wiring substrate 40 from being changed due to the influence of the outside air temperature or the like, it is preferable to provide an equalization member (e.g., metal film) having high thermal conductivity for thermally equalizing the influence of the temperature distribution of the outside air temperature on the back side (e.g., outside air side) of the wiring layer on which the second temperature sensor 702 and the fourth temperature sensor 704 are mounted. Here, as the equalization member, a metal foil, a metal thin plate, or the like may be used, but as similar to the wiring layer formed on the wiring substrate 40, it is desirable to form the equalization member as a wiring pattern (e.g., solid pattern) of the inner layer of the wiring substrate 40 (e.g., multilayer rigid substrate). In this case, the wiring pattern of the inner layer, which is used as the equalization member, may be a ground pattern, but is preferably an independent pattern that is connected to no electric circuit and through which no current flows.

The wireless communication unit 403 is configured to transmit the acquired deep body temperature data to an external management apparatus or an information terminal (for example, a smartphone or the like). Here, the wireless communication unit 403 transmits the deep body temperature data to the external management apparatus or the information terminal wirelessly, for example, using such as Bluetooth®. The thin coin battery 404 supplies power to the processing circuit 408, the wireless communication unit 403, and the like described above. In order to reduce a plane area (i.e., the sticking area) of the body temperature measurement unit 15 (i.e., deep body thermometer 1) and to prevent influences of the heat generated by change in the outside air temperature and operations of the wireless communication unit 403, the wireless communication unit 403 and the coin battery 404 are disposed on the side opposite to the temperature sensors with the wiring substrate 40 interposed therebetween.

On the upper surface of the wiring substrate 40, a power supply switch 406 is provided for receiving an ON/OFF operation of a power supply with the upper exterior body 10 interposed therebetween is mounted. In addition, on the upper surface of the wiring substrate 40, an LED 405 (corresponding to a light emitting unit described in the claims) that lights or flickers in accordance with an operation by a user (for example, a measurement subject, a nurse, or the like), a measurement state of the body temperature (for example, turning ON/OFF of the power supply switch 406, start/end of measurement, and the like) is mounted. It is noted that, instead of the LED, for example, a VCSEL or the like may be used. Further, an FPC connector 407 for electrically connecting the flexible substrate 50 is attached to the lower surface side of the wiring substrate 40.

According to an exemplary aspect, the flexible substrate 50 is made of, for example, polyimide, polyester, or the like, and has flexibility. The first temperature sensor 701 that acquires the temperature of the first thermal resistor 301 on a skin side, and the third temperature sensor 703 that acquires the temperature of the second thermal resistor 302 on a skin side are mounted on the flexible substrate 50. More specifically, as illustrated in FIG. 6, in the flexible substrate 50, thermal equalization patterns 501 and 502 are formed in order to equalize the peripheral temperature distribution, one terminal of the first temperature sensor 701 is connected to the thermal equalization pattern 501, and one terminal of the third temperature sensor 703 is connected to the thermal equalization pattern 502. Moreover, the thermal equalization patterns 501 and 502 are made of, for example, a material having high thermal conductivity such as a metal film. Each of the first temperature sensor 701 and the third temperature sensor 703 is connected to the wiring substrate 40 (i.e., the processing circuit 408) with the wiring pattern 53 and the FPC connector 407 interposed therebetween, and electric signals (e.g., voltage values) corresponding to the temperature are read by the processing circuit 408. As described above, the lower exterior body 20, the flexible substrate 50, the thermal resistor layer 30, and the wiring substrate 40 are fixed in a close contact manner by, for example, a double-sided adhesive tape, a film having adhesiveness on both sides, or the like so as to generate no gap therebetween in order to form the heat flux.

As illustrated in FIG. 7, the sticking member 60 is configured to include a first adhesive layer 601 stuck to an outer surface of the lower exterior body 20, a breathable ventilation layer 603 (that is, a moisture permeable layer that transmits moisture) stuck to the first adhesive layer 601, and a second adhesive layer 602 stuck to the ventilation layer 603. In a case where the deep body thermometer 1 is stuck to the skin to be used, sweat accumulated between the skin and the deep body thermometer 1 (i.e., the lower exterior body 20) for a long time may cause the skin to be inflamed, however, by providing the ventilation layer 603 that transmits moisture in the sticking member 60, stuffiness by sweat or the like is suppressed. As the ventilation layer 603 (e.g., moisture permeable layer), for example, a nonwoven fabric may be suitably used. It is noted that cloth of woven fabric or knitted fabric may be used instead of the nonwoven fabric. Further, paper, wood, sponge/foamed material of open-cells, or the like may be used, or a plastic, rubber, or metal structure having a groove or a hole extending from the center of the body temperature measurement unit 15 toward the peripheral edge thereof may be used.

Since the ventilation layer 603 (e.g., a moisture permeable layer) contains air therein, the thermal conductivity is usually low. For this reason, when the ventilation layer 603 is provided between the skin and the sensor, the body temperature measurement accuracy is affected. Therefore, in order to stably measure the body temperature, the ventilation layer 603 is not arranged in a region overlapping with the first temperature sensor 701 and the third temperature sensor 703 that measure the temperature of the skin and the thermal equalization patterns 501 and 502 connected to them.

Here, a case in which a nonwoven fabric is used as the ventilation layer 603 will be described as an example. As illustrated in FIG. 7, a biocompatible double-sided adhesive tape or a film having adhesiveness on both sides (e.g., first adhesive layer 601 and second adhesive layer 602) is stuck to both sides of the nonwoven fabric (e.g., ventilation layer 603). In the ventilation layer 603 and the second adhesive layer 602, first through-holes 60a and 60b in which the first temperature sensor 701 and the third temperature sensor 703 are housed in inner side portions are formed in the thickness direction when viewed in a plan view. Here, it is preferable that no through-holes be formed in the double-sided adhesive tape or the film having adhesiveness on both sides (e.g., the first adhesive layer 601) to be stuck to the lower exterior body 20. This is because when the through-hole is formed, that is, when the first adhesive layer 601 is not present in the region where the through-hole is provided, an area of the first adhesive layer 601 decreases, and the lower exterior body 20 is less likely to make close contact with the skin, and the measurement accuracy may be lowered.

Further, in general, since the double-sided adhesive tape or a film having adhesiveness on both sides (e.g., second adhesive layer 602) has a lower moisture permeability than the nonwoven fabric (e.g., ventilation layer 603), it is preferable to form a plurality (e.g., seven in the example of FIG. 7) of second through-holes 60c formed in the thickness direction at least in the second adhesive layer 602. In this case, for example, it is preferable to arrange the second through-holes 60c having a diameter of about 1 to 10 mm with intervals of about 2 to 20 mm. It is noted that, instead of the second through-holes 60c, for example, a notch having an intersection portion (that is, a notch intersecting in a cross shape) may be formed. In this case, it is preferable to arrange the intersecting notches having a length of about 1 to 10 mm with intervals of about 2 to 20 mm.

Figure 8:
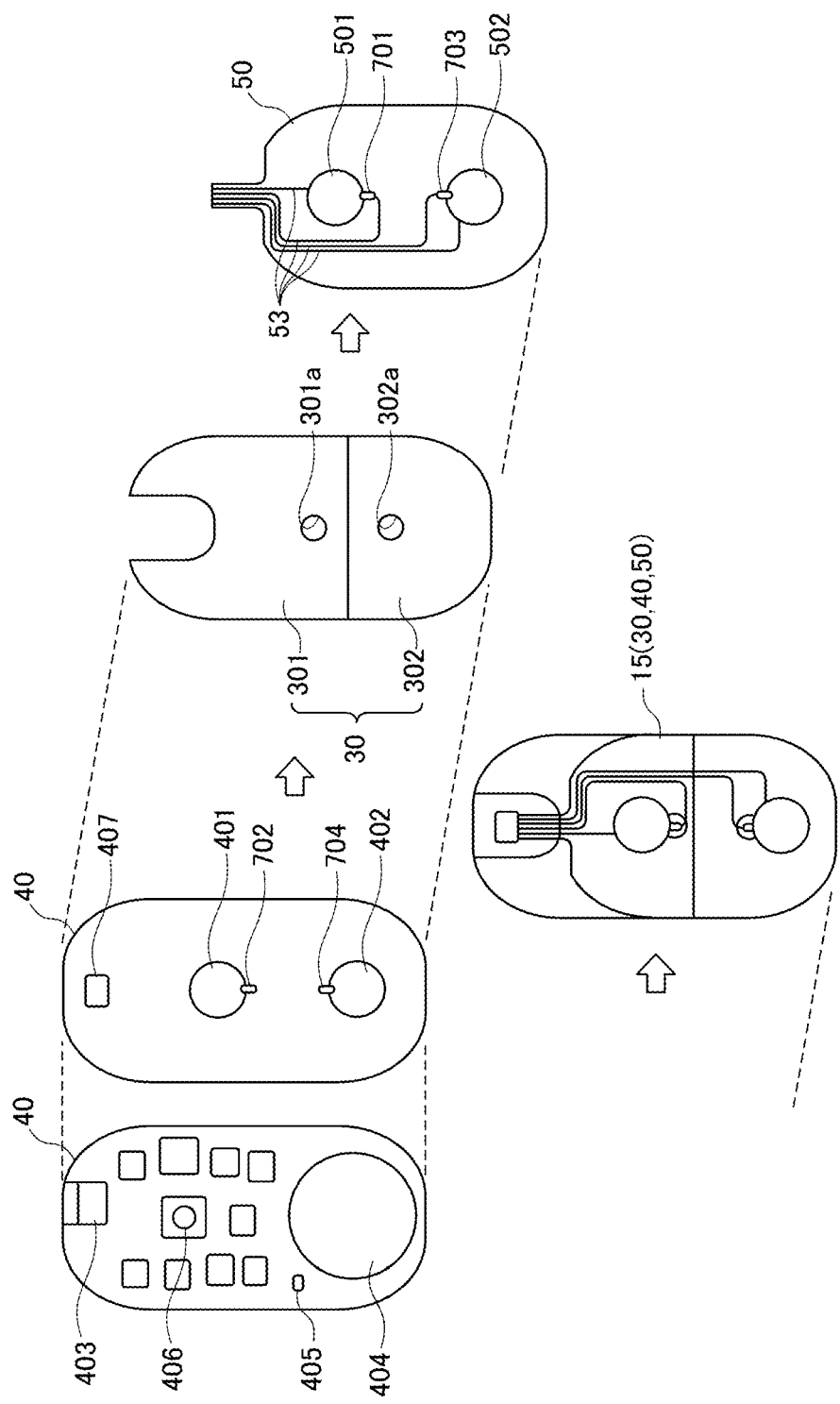
FIG. 8 is a view (part 1) for explaining a method of assembling the deep body thermometer according to the exemplary embodiment.

Next, an assembling method (i.e., a manufacturing method) of the deep body thermometer 1 will be described with reference to FIG. 8 and FIG. 9 together. FIG. 8 is a view (part 1) for explaining the method of assembling the deep body thermometer 1. FIG. 9 is a view (part 2) for explaining the method of assembling the deep body thermometer 1.

The deep body thermometer 1 is assembled, for example, in the following steps (1) to (6).

One surface of the thermal resistor layer 30 (e.g., the first thermal resistor 301 and the second thermal resistor 302) is fixed to the back surface of the wiring substrate 40 in a close contact manner by a double-sided adhesive tape or a film having adhesiveness on both sides.

After the flexible substrate 50 is connected to the FPC connector 407 of the wiring substrate 40, the flexible substrate 50 is fixed to the other surface of the thermal resistor layer 30 (e.g., the first thermal resistor 301 and the second thermal resistor 302) in a close contact manner by a double-sided adhesive tape or a film 45 having adhesiveness on both sides.

The coin battery 404 is fitted to the wiring substrate 40 (for example, inserted into a battery holder mounted on the wiring substrate 40).

The flexible substrate 50 side of the body temperature measurement unit 15 (e.g., the wiring substrate 40, the thermal resistor layer 30, and the flexible substrate 50) is fixed to a central portion of the lower exterior body 20 by a double-sided adhesive tape or a film having adhesiveness on both sides.

A peripheral edge portion of the upper exterior body 10 and a peripheral edge portion of the lower exterior body 20 are fixed in a close contact manner by the double-sided adhesive tape or the film having adhesiveness on both sides used in the above (4).

The sticking member 60 is stuck to the lower exterior body 20 (e.g., bottom surface). As described above, the deep body thermometer 1 is assembled. It is noted that, in the present embodiment, since the first temperature sensor 701 and the third temperature sensor 703 are not arranged at symmetrical positions with respect to the center of the lower exterior body 20, a mark 20a for indicating a sticking direction of the sticking member 60 is put on the lower exterior body 20. Therefore, the sticking member 60 is stuck to the lower exterior body 20 in a manner such that the notch of the sticking member 60 and the mark 20a coincide with each other, whereby the sticking direction of the sticking member 60 may be prevented from being wrong. It is also noted that the first temperature sensor 701 and the third temperature sensor 703 can be arranged at the symmetrical positions with respect to the center of the lower exterior body 20, and the mark 20a indicating the sticking direction of the sticking member 60 may be eliminated in an alternative aspect.

In order to prevent the second adhesive layer 602 from being stuck to a portion other than the measurement subject in a state before use, the second adhesive layer 602 is covered with a separator that may be peeled at the time of measurement. When the deep body thermometer 1 assembled as described above is used, first, a separator (e.g., release paper) attached to the second adhesive layer 602 of the sticking member 60 is peeled off. Then, after the power supply switch 406 is pressed to turn ON the power supply, the second adhesive layer 602 is stuck to a measurement site of the measurement subject. It is noted that, since the power supply switch 406 may be erroneously pressed during the measurement, it is preferable that an operation of turning ON/OFF the power supply be received by, for example, a long pressing operation of equal to or more than several seconds or by a plurality of pressing operations. When the operation is received, the LED 405 emits light in a predetermined light emission pattern, and informs the user (for example, a measurement subject, a nurse, or the like) that the operation has been received. When the power supply is turned ON, the deep body temperature measurement, storage of the measurement data in the memory, and wireless data output are started. Note that, in a case where the deep body temperature is measured, a measurement site is preferably the chest, the armpit, the back, the waist, the neck, the back of the head, or the forehead, but may be the abdomen, the flank, the thigh, the ankle, the arm, the wrist, or the like when body temperature fluctuation is measured.

As described in detail above, according to the present embodiment, the upper exterior body 10 for accommodating the body temperature measurement unit 15 is made of the foamed material of the closed cell or the semi-closed cell having waterproof properties, and the lower exterior body 20 is formed of the non-foamed resin film. Then, the peripheral edge portions of the upper exterior body 10 and the lower exterior body 20 are in close contact with each other. That is, since the upper exterior body 10 and the lower exterior body 20 that are made of a material having an excellent waterproof property (not having moisture permeability) are fixed in close contact manner, the entry of sweat, disinfecting solution, and the like can be prevented from entry into the inside with a relatively simple structure. Further, since the lower exterior body 20 (e.g., the side in contact with the body surface) is formed of the non-foamed resin film excellent in thermal conductivity, the measurement sensitivity of body temperature may be favorably maintained. Further, since the upper exterior body 10 (e.g., the side in contact with the outside air) is made of the foamed material of the closed cell or the semi-closed cell having low thermal conductivity (that is, excellent in heat insulation property), it is hardly affected by an outside air temperature change (disturbance), and a stable body temperature measurement may be performed. As a result, it is possible to ensure waterproof properties with a relatively simple structure without lowering the measurement sensitivity and the like.

According to the present embodiment, since the body temperature measurement unit 15 can be accommodated in the upper exterior body 10 formed with a concave cross-section, the body temperature measurement unit 15 may be brought into close contact with and fixed to the lower exterior body 20 formed in a planar shape. That is, since the lower exterior body 20 and the body temperature measurement unit 15 may be brought into close contact with each other, the thermal conductivity (that is, accurately and stably measure the body temperature) can be maintained. Further, the peripheral edge portion of the upper exterior body 10 formed with a concave cross-section and the peripheral edge portion of the lower exterior body 20 formed in a planar shape are fixed in close contact manner, so that the close contact area may be relatively large, and the waterproof property may be further enhanced with a relatively simple structure.

According to the present embodiment, since the first through-holes 60a and 60b in which the first temperature sensor 701 and the third temperature sensor 703 are housed in the inner side portions thereof in the ventilation layer 603 and the second adhesive layer 602 configuring the sticking member 60 are formed in the thickness direction, the deep body thermometer 1 may be stuck in a manner such that the body surface of the measurement subject and the first temperature sensor 701 and the third temperature sensor 703 are close contact with each other with the first adhesive layer 601 and the film-shaped lower exterior body 20 interposed therebetween. Therefore, since a layer of air having low thermal conductivity is not interposed therebetween, the body temperature may be accurately and stably measured continuously. Also, sweat or the like coming out from the body surface may be discharged to the outside through the ventilation layer 603. Therefore, even when the body temperature is continuously measured by sticking the deep body thermometer 1 for a long time, it is possible to suppress the skin from being steamed.

According to the present embodiment, since the second through-holes 60c formed in the thickness direction are further formed in addition to the first through-holes 60a and 60b in the inner side portions of which the first temperature sensor 701 and the third temperature sensor 703 described above are housed, sweat or the like coming out from the body surface may be discharged to the outside through the ventilation layer 603 more efficiently. Therefore, even when the body temperature is continuously measured by sticking the deep body thermometer 1 for a long period of time, it is possible to more effectively suppress the skin from being steamed.

According to the present embodiment, since the four temperature sensors 701 to 704 are arranged in the inner side portions of the third through-holes 301a and 302a that penetrate the thermal resistor layer 30 (e.g., the first thermal resistor 301 and the second thermal resistor 302) in the thickness direction, that is, the contact between the temperature sensors and the thermal resistor layer 30 is prevented, the temperature can be more accurately detected and/or measured.

According to the present embodiment, the thermal resistor layer 30 has two thermal resistors 301 and 302 having different thermal resistance values and substantially the same thickness, and a pair of temperature sensors (e.g., sensors 701 and 702) is arranged in each of the two thermal resistors 301 and 302. Therefore, it is possible to measure the temperature distribution (e.g., the temperatures of two heat flow systems having different thermal resistance values) generated by the two thermal resistors 301 and 302 having different thermal resistance values. Further, since the two thermal resistors 301 and 302 having different thermal resistance values are formed so as to have substantially the same thickness, the structure may be simplified and the manufacturing cost may be reduced.

According to the present embodiment, the body temperature measurement unit 15 further includes the wireless communication unit 403 that is configured to transmit the acquired body temperature data to the outside, and the coin battery 404 that supplies power to the processing circuit 408 and the wireless communication unit 403. Therefore, since a cable for connecting to an external apparatus is unnecessary, waterproof processing (e.g., waterproof structure) of a cable taking-out unit is unnecessary. Therefore, the waterproof property can be improved with a relatively simple structure. Further, since the cable disappears, behavior of the measurement subject is less likely to be inhibited, and thus it becomes possible to measure the body temperature continuously for a long time.

According to the present embodiment, the wireless communication unit 403 and the coin battery 404 are disposed on the side opposite to the four temperature sensors 701-704 with respect to the wiring substrate 40. Therefore, the plane area (e.g., sticking area) of the deep body thermometer 1 may be reduced. Further, it is possible to prevent the heat generation associated with the operation of the wireless communication unit 403 or the like from affecting the detection value of the temperature sensors. Further, by arranging a member having a relatively large heat capacitance, such as the wireless communication unit 403, the coin battery 404, and the like, between the upper exterior body 10 (e.g., outside air side) and the thermal resistor layer 30 and the temperature sensors, it is possible to further reduce the influence (e.g., disturbance) of the change in the outside air temperature.

According to the present embodiment, since the LED 405 that lights or flickers in accordance with the operation by the user (for example, the measurement subject or the nurse) and the measurement state of the body temperature is provided, for example, it is possible to cause the user (for example, the measurement subject or the nurse) to visually recognize information such as turning ON/OFF of the power supply, the working of measurement, the end of the measurement, the occurrence of the error (abnormality), and the like.

In general, it is noted that the exemplary embodiment of the present invention has been described above, but the present invention is not limited to the above-described embodiment, and various modifications are possible. For example, the shapes, the sizes, the arrangement of the thermal resistor layer 30 (the first thermal resistor 301 and the second thermal resistor 302), the wiring substrate 40, and the flexible substrate 50, the arrangement of the first temperature sensor 701 to the fourth temperature sensor 704, and the like, which are described above, are not limited to the above-described embodiment, and may be arbitrarily set according to, for example, requirements such as accuracy and the like.

In the above embodiment, the case where the present invention is applied to a two-heat flux type deep body thermometer has been described as an example, but the present invention may be applied to a one-heat flux type deep body thermometer. In addition, the present invention may also be applied to a thermometer other than the deep body thermometer. In addition, instead of the coin battery 404, for example, a button battery or a secondary battery that is charged in a wireless manner may be used.

REFERENCE SIGNS LIST

1 DEEP BODY THERMOMETER
10 UPPER EXTERIOR BODY
15 BODY TEMPERATURE MEASUREMENT UNIT
20 LOWER EXTERIOR BODY
30 THERMAL RESISTOR LAYER
301 FIRST THERMAL RESISTOR
302 SECOND THERMAL RESISTOR
301a, 302a THIRD THROUGH-HOLE
40 WIRING SUBSTRATE
401, 402 THERMAL EQUALIZATION PATTERN
403 WIRELESS COMMUNICATION UNIT
404 COIN BATTERY
405 LED
406 POWER SUPPLY SWITCH
407 FPC CONNECTOR
50 FLEXIBLE SUBSTRATE
501, 502 THERMAL EQUALIZATION PATTERN
60 STICKING MEMBER
601 FIRST ADHESIVE LAYER
602 SECOND ADHESIVE LAYER
603 VENTILATION LAYER
60a, 60b FIRST THROUGH-HOLE
60c SECOND THROUGH-HOLE
701, 702, 703, 704 TEMPERATURE SENSOR

The invention claimed is:

1. A thermometer comprising:
   a body temperature measurement unit having:
      a thermal resistor layer including a thermal resistor having a predetermined thermal resistance value,
      a plurality of temperature sensors arranged in the thermal resistor layer in a thickness direction thereof, and
      a wiring substrate with a processing circuit mounted thereon that is configured to process an output signal of each of the plurality of temperature sensors;
   an upper exterior body that accommodates the body temperature measurement unit; and
   a lower exterior body that includes a resin film and that has a thermal resistance value that is lower than a thermal resistance value of the upper exterior body.

2. The thermometer according to claim 1,
   wherein a through-hole that penetrates in a thickness direction is disposed in the thermal resistor layer, and
   wherein the plurality of temperature sensors are arranged on an inner side of the through-hole with a space interposed between the plurality of temperature sensors and a peripheral wall defining the through-hole in the thermal resistor layer.

3. The thermometer according to claim 1,
   wherein the thermal resistor layer has two thermal resistors having different thermal resistance values and substantially a same thickness as each other, and
   wherein a pair of the temperature sensors of the plurality of temperature sensors are arranged in each of the two thermal resistors.

4. The thermometer according to claim 1, further comprising a light emitting unit disposed on a surface of the wiring substrate and configured to light or flicker based on an operation by a user and a measurement state of a body temperature.

5. The thermometer according to claim 1, further comprising:
   a plurality of through-holes that penetrate the thermal resistor layer in a thickness direction thereof,
   wherein respective pairs of the plurality of temperature sensors are disposed on inner sides of the respective through-holes of the plurality of through-holes with a space interposed between each pair of temperature sensors.

6. The thermometer according to claim 1, wherein the upper exterior body comprises a concave cross-section that accommodates the body temperature measurement unit, and the lower exterior body comprises a planar shape that fixes the body temperature measurement unit in a close contact manner.

7. The thermometer according to claim 6, wherein a peripheral edge portion of the upper exterior body formed with a concave cross-section contacts a peripheral edge portion of the lower exterior body formed in a planar shape.

8. The thermometer according to claim 1, wherein the body temperature measurement unit further comprises:
a wireless communication unit configured to transmit acquired body temperature data from the plurality of temperature sensors; and
a battery configured to supply power to the processing circuit and the wireless communication unit.

9. The thermometer according to claim 8, wherein the wiring substrate has a first main surface and a second main surface that oppose each other, the plurality of temperature sensors is arranged on the first main surface side of the wiring substrate, and the wireless communication unit and the battery are arranged on the second main surface side of the wiring substrate.

10. The thermometer according to claim 1, wherein the upper exterior body comprises a foamed material of a closed cell or a semi-closed cell having a waterproof property.

11. The thermometer according to claim 10, wherein the thermal resistance value of the lower exterior body is lower than the thermal resistance value of the foamed material of the upper exterior body.

12. The thermometer according to claim 11, wherein the upper exterior body comprises peripheral edge portions that are in contact with peripheral edge portions of the lower exterior body.

13. The thermometer according to claim 1, further including a sticking member having a first adhesive layer stuck to an outer surface of the lower exterior body, a breathable ventilation layer stuck to the first adhesive layer, and a second adhesive layer stuck to the ventilation layer.

14. The thermometer according to claim 13, further comprising a first through-hole in an inner side of which the temperature detection unit is housed is disposed in the ventilation layer and the second adhesive layer in a thickness direction when viewed in a plan view thereof.

15. The thermometer according to claim 14, wherein a plurality of second through-holes are disposed in a thickness direction in at least the second adhesive layer.

16. The thermometer according to claim 14, wherein a notch having an intersection portion is disposed in at least the second adhesive layer.

17. A thermometer comprising:
a body temperature measurement unit having:
a single thermal resistor layer including a thermal resistor,
a plurality of temperature sensors disposed in the single thermal resistor layer in a thickness direction thereof, and a space being between at least a pair of the plurality of temperature sensors in the thickness direction of the single thermal resistor layer, and
a wiring substrate disposed on the single thermal resistor layer;
an upper exterior body that accommodates the body temperature measurement unit; and
a lower exterior body that includes a resin film and that has a thermal resistance value that is lower than a thermal resistance value of the upper exterior body.

18. The thermometer according to claim 17, wherein the wiring substrate comprises a processing circuit mounted thereon that is configured to process an output signal of each of the plurality of temperature sensors.

19. A thermometer comprising:
a body temperature measurement unit having:
a thermal resistor layer including a thermal resistor,
a plurality of temperature sensors disposed in the thermal resistor layer in a thickness direction thereof, and
a wiring substrate disposed on the thermal resistor layer;
an upper exterior body comprising a foamed material having a waterproof property and that accommodates the body temperature measurement unit; and
a lower exterior body that includes a resin film and that has a thermal resistance value that is lower than a thermal resistance value of the upper exterior body
wherein the thermal resistance value of the resin film of the lower exterior body is lower than the thermal resistance value of the foamed material of the upper exterior body, and
wherein the upper exterior body comprises peripheral edge portions that are in contact with peripheral edge portions of the lower exterior body.

20. The thermometer according to claim 17, further comprising:
a plurality of through-holes that penetrate the single thermal resistor layer in a thickness direction thereof,
wherein the pair of the plurality of temperature sensors is disposed on an inner side of one of the plurality of through-holes with the space interposed between the pair of temperature sensors.

* * * * *